US008207484B1

(12) United States Patent
Williams (10) Patent No.: US 8,207,484 B1
(45) Date of Patent: Jun. 26, 2012

(54) STREAK IMAGE SENSOR AND METHOD OF OPERATING

(75) Inventor: George M. Williams, Portland, OR (US)

(73) Assignee: Voxtel, Inc., Beaverton, OR (US)

( * ) Notice: Subject to any disclaimer, the term of this patent is extended or adjusted under 35 U.S.C. 154(b) by 780 days.

(21) Appl. No.: 12/327,070

(22) Filed: Dec. 3, 2008

Related U.S. Application Data (60) Provisional application No. 60/992,999, filed on Dec. 6, 2007.

(51) Int. Cl.
*G01C 21/02* (2006.01)
*G01C 3/08* (2006.01)
*G01N 21/86* (2006.01)

(52) U.S. Cl. .............. 250/203.6; 250/559.36; 356/4.01; 348/31

(58) Field of Classification Search ............... 250/221, 250/559.36, 559.38, 202, 203.2, 203.5, 203.6, 250/559.26, 559.29; 356/3.01, 4.01; 348/31, 348/81

See application file for complete search history.

(56) References Cited

U.S. PATENT DOCUMENTS

| | | | |
|---|---|---|---|
| 5,528,493 A | | 6/1996 | Potter |
| 6,222,409 B1 * | | 4/2001 | Kieda et al. .................... 327/283 |
| 6,836,285 B1 * | | 12/2004 | Lubard et al. .................... 348/31 |
| 7,345,743 B1 * | | 3/2008 | Hartman et al. ............. 356/4.01 |
| 7,400,384 B1 * | | 7/2008 | Evans et al. .................... 356/5.01 |
| 7,697,748 B2 * | | 4/2010 | Dimsdale et al. ............. 382/154 |
| 2007/0035624 A1 | | 2/2007 | Lubard et al. |

OTHER PUBLICATIONS

R.S. Jacobson et al, ONR Spearheads Successful Mine Countermeasures Program; Program Management, May-Jun. 2000, pp. 66-72, U.S.A.

Stuart Kleinfelder, A Solid State Streak Camera, 26th International Congress on High-Speed Photography and Photonics, Proc. of SPIE vol. 5580, pp. 235-243, U.S.A.

* cited by examiner

*Primary Examiner* — Georgia Y Epps
*Assistant Examiner* — Don Williams
(74) *Attorney, Agent, or Firm* — Chernoff, Vilhauer, McClung & Stenzel (57) ABSTRACT

A LIDAR system that includes a streak image sensor having multiple sensor elements for receiving optical return signals from portions of a spatial region within their respective instantaneous fields of view is operated by periodically sampling and storing electrical signals generated by the sensor elements respectively, and initiating the periodic sampling of the electrical signals of each sensor individually and independently by reference to a feature of that sensor's electrical signal that represents a boundary between materials with different optical properties.

17 Claims, 6 Drawing Sheets

STREAK IMAGE SENSOR AND METHOD OF OPERATING

CROSS-REFERENCE TO RELATED APPLICATION

This application claims benefit of U.S. Provisional Application No. 60/992,999 filed Dec. 6, 2007, the entire disclosure of which is incorporated herein by reference for all purposes.

REFERENCE TO GOVERNMENT CONTRACT

This invention was made with government support under Contract N00178-06-C-3024 awarded by the United States Navy. The government has certain rights in the invention.

BACKGROUND OF THE INVENTION

This invention relates to a streak image sensor and a method of operating a streak image sensor.

The word "submerged" as used in this application as applied to an object in a body of water means both fully submerged, so that the object does not project above the free surface of the water, and partially submerged, so that the object projects partially above the free surface of the water.

It is desirable to identify and locate submerged objects, such as flotsam and jetsam, in order to mitigate the danger that such objects may pose to navigation. In addition, it may be desirable to monitor the location of objects that have been deliberately deployed at or below the water surface, such as equipment for recovery of wave energy in order to check the equipment for damage.

Figure 1A:
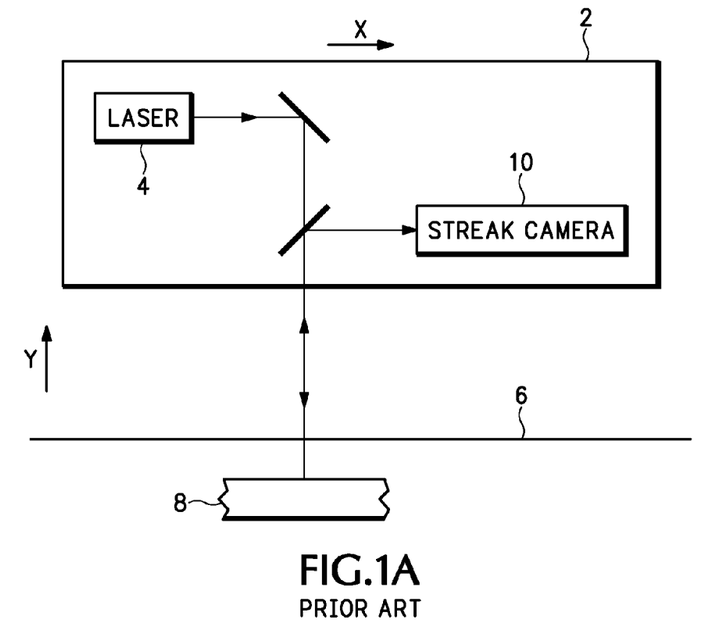
FIG. 1A and FIG. 1B illustrate schematically a LIDAR system as applied to detection of submerged objects.
Figure 1B:
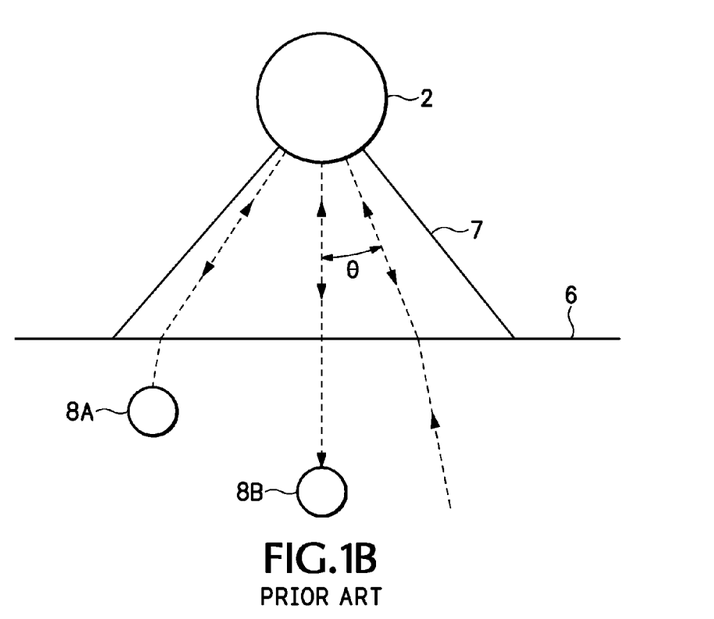

Airborne light detection and ranging (LIDAR) systems have been used to obtain information regarding depth and location of submerged objects. FIG. 1 illustrates schematically one possible implementation of an airborne LIDAR system. As shown in FIGS. 1A and 1B, a probe 2 (which may be suspended from an aircraft traveling in a direction X) contains a laser light source 4 that emits a pulsed beam of light directed downward towards the water surface 6. The pulse emitted by the laser source 4 may have a duration of about 6 ns full width at half maximum amplitude. Suitable optics (not shown) spread the narrow output beam of the laser light source to create a fan beam 7 (see FIG. 1B). The fan beam 7 illuminates a strip of the water surface that extends perpendicular to the direction of travel of the probe. Some of the laser light may be reflected from the water surface, some light that enters the water is absorbed, some light that enters the water is backscattered by the water, and some light is reflected off objects 8 that are more or less close to the water surface. Some of the reflected and backscattered light is returned to the probe as a return laser light signal. The time at which return light (reflected and backscattered) is received from a depth d below the water surface depends on the depth d and on the height h of the probe above the water surface. The return light varies in intensity as a function of time depending on whether the return light is reflected or backscattered, the reflective properties of reflective surfaces, the shape and orientation of reflective surfaces, the optics of the transmitter and receiver, the distance traveled by the return light, and the attenuation and scattering of the light.

The return light is delivered to a streak camera 10, having multiple sensor channels CH1-CHn (FIG. 2) each including a sensor element 12, such as an avalanche photodiode (APD). Each channel CH receives return light along a respective azimuth θ (relative to vertical) of the fan beam from an instantaneous field of view (IFOV) of its sensor element. The IFOV of each sensor element contains a respective segment of the illuminated strip of the water surface. The IFOV of each sensor element 12 is stationary relative to the LIDAR system itself but moves relative to a terrestrial frame of reference as the aircraft moves, and accordingly, the instantaneous terrestrial field of view of each sensor element changes as the aircraft moves along its trajectory.

Figure 2:
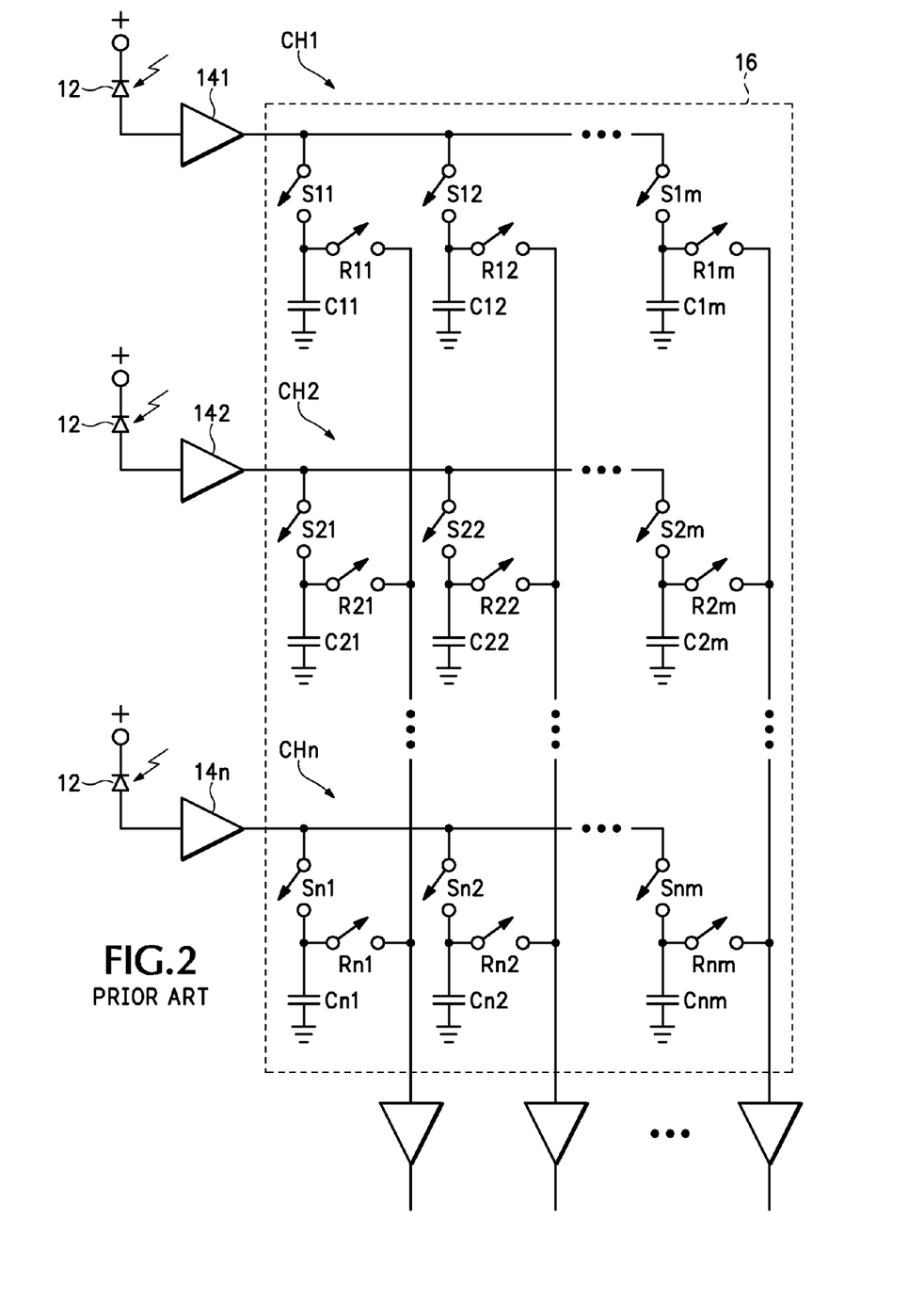
FIG. 2 is a schematic diagram of part of a streak camera that may be employed in the LIDAR system shown in FIGS. 1A and 1B.

The current signals generated by the APDs 12 are amplified by a preamplifier 14 and converted to respective voltage signals which are sampled and stored using a switched capacitor array (SCA) 16. As shown in FIG. 2, the capacitors are organized in a rectangular array of n rows and m columns where each row i (i=1 . . . n) is associated with one channel of the streak camera and each column j (j=1 . . . m) spans all channels and contains one capacitor of each channel. Each capacitor Cxj (j=1 . . . m) in row x is selectively connected to the output of the channel preamplifier 14x by closing (rendering conductive) and then opening (rendering non-conductive) a sampling switch Sxj. The sampling interval between closing two consecutive sampling switches in row x may be about 2-10 ns, corresponding to a resolution of about 0.25-1.25 m in water. The sampling switches S in each row of the SCA are controlled so that the n switches Siy in column y close essentially simultaneously and open essentially simultaneously.

Subsequently, the voltages stored on the capacitors are read out and exported for evaluation by sequentially closing readout switches Rij. The readout switches R may be operated either in column sequential fashion and the output signals multiplexed to a common ADC for digitizing and subsequent processing or the switches of the m columns may be operated synchronously and the output signals supplied to respective ADCs for digitizing and processing. The output signals may be used to drive a display in which the brightness of the display depends on the amplitude of the signal. In this manner, a 2D range-azimuth image of the return light received in response to each laser pulse is obtained. Examination of the images obtained in response to successive laser pulses provides information regarding the depth and location of submerged objects.

It has been recognized that the 2D image that is acquired in the manner described above is distorted because the arrival time of the return light depends on the azimuth angle of the light path relative to vertical. Thus, referring to FIG. 1B, the round-trip propagation time of return light received from the water surface along a path at an angle θ to vertical by a probe at altitude h is 2*h/c*cos θ, where c is the velocity of light in air. In addition, local conditions may result in the round-trip propagation time varying as a function of azimuth angle of the light path. For example, when viewing a river or other narrow body of water having overhanging trees along one or both banks, reflections from the foliage will be received before return light received from the water surface beneath the foliage.

SUMMARY OF THE INVENTION

In accordance with a first aspect of the claimed subject matter there is provided a method of operating a LIDAR system including a light source for emitting an optical fan beam towards a spatial region to be inspected, and a streak image sensor having a plurality of sensor elements for receiving optical return signals from the portions of the spatial region within their respective instantaneous fields of view, each sensor element generating corresponding electrical signals, the method comprising periodically sampling and storing the electrical signals generated by the sensor elements respectively, and initiating the periodic sampling of said electrical signals of each sensor individually and independently by reference to a feature of that sensor's electrical signal that represents a boundary between materials with different optical properties.

In accordance with a second aspect of the claimed subject matter there is provided a method of operating a LIDAR system including a light source for emitting an optical fan beam through a first medium towards a second medium that is to be inspected, and a streak image sensor having a plurality of sensor elements for receiving optical return signals from the portions of the second medium within their respective instantaneous fields of view, each sensor element generating corresponding electrical signals, the method comprising periodically sampling and storing the electrical signals generated by the sensor elements respectively, and initiating the periodic sampling of said electrical signals of each sensor element individually by reference to expected distance of the sensor from a boundary between the first medium and the second medium.

In accordance with a third aspect of the claimed subject matter there is provided a method of operating a LIDAR system including a light source for emitting an optical fan beam towards a spatial region to be inspected, and a streak image sensor having a plurality of sensor elements for receiving optical return signals from the portions of the spatial region within their respective instantaneous fields of view, each sensor element generating corresponding electrical signals, the method comprising periodically sampling and storing the electrical signals generated by the sensor elements respectively, subsequently terminating the storing of samples of the electrical signal, and initiating the termination of storing of said samples of said electrical signals of each sensor individually and independently by reference to a feature of that sensor's electrical signal that represents a boundary between materials with different optical properties.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

The intensity of the return light received by a sensor channel in a LIDAR system used for detection of submerged objects varies over a very wide range. It has been estimated that under some conditions, a specular reflection ("glint") from the surface of the water might deliver as many as $7 \times 10^{12}$ photons to a single sensor channel whereas the return signal due to backscatter could be eight orders of magnitude smaller. A reflection from a solid object at the water surface might deliver about $3 \times 10^6$ photons.

Figure 3:
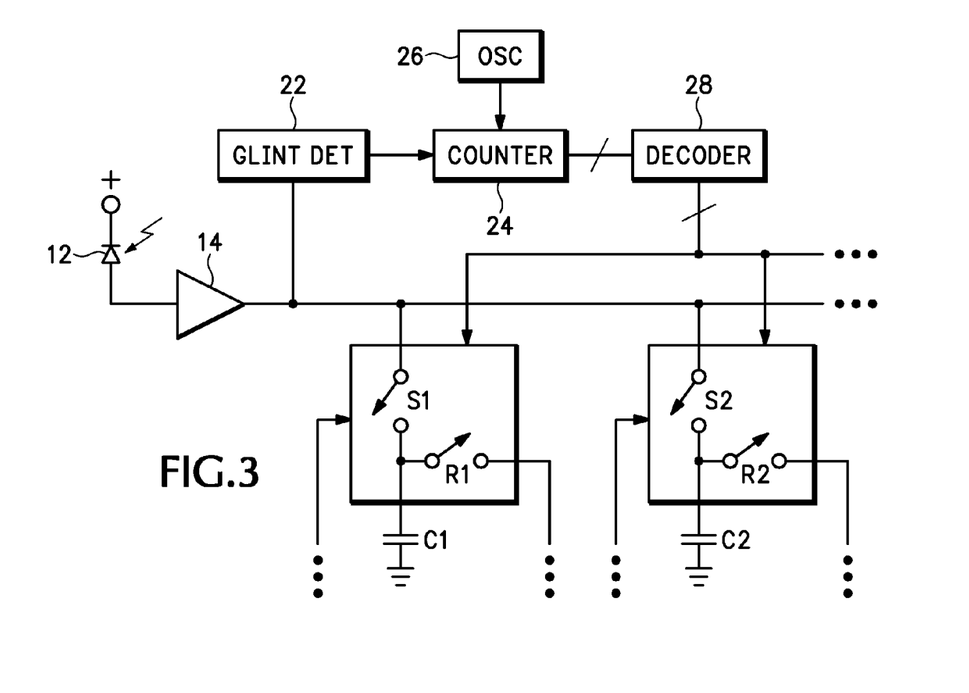
FIG. 3 is a schematic block diagram of part of a channel of a streak camera embodying the present invention.

Referring to FIG. 3, each channel CH of the streak camera includes a glint detector 22 that receives the output signal of the preamplifier 14 and asserts its output in a high state in response to detection of an input signal of sufficient magnitude to be associated with a specular reflection from the surface of the water. When the output signal of the glint detector goes high, it enables a counter 24 which counts clock pulses generated by an oscillator 26. Let us assume that each row of the SCA contains 128 capacitors and that the counter counts up through a range from 1 to 128. As the counter 24 counts from 1 to 128, the output of a decoder 28 successively closes and opens the switch S1, then closes and opens the switch S2, and so on to switch S128. In this manner, sampling of the return signal in each channel is individually synchronized to the arrival in that channel of the signal feature representing glint from the water surface. When the sample values stored in one column of the SCA are read out by successively closing and opening the readout switches R, distortion of the range-azimuth image due to the different propagation times through the air at different azimuth angles is removed.

The clock oscillator 26 is shared by all channels. Accordingly, the channels operate synchronously with one another.

Figure 4:
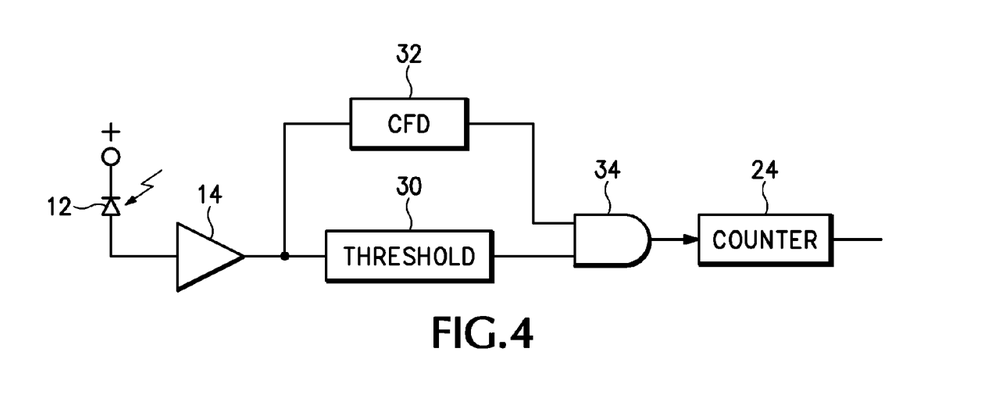
FIG. 4 is a schematic block diagram of part of a channel of a second streak camera embodying the present invention.

The glint detector 22 may be a simple threshold detector with a threshold level higher than the signal level associated with noise, such as stray light entering the sensor channel. However, the slew rate of the rising edge of the return light signal may vary over quite a large range and consequently the time at which the output signal of the glint detector goes high, relative to the time at which the signal edge starts to rise, may vary over a large range. In order to reduce the variation, a preferred embodiment of the invention employs the output signal of a threshold detector to qualify the output signal of a constant fraction discriminator (CFD). Thus, referring to FIG. 4, the output signal of the preamplifier 14 is applied both to a threshold detector 30 and to a CFD 32. The CFD generates an output pulse approximately at the time of the inflection on the rising edge of the input signal and its timing relative to the starting of the rise is less dependent on the slew rate of the rising edge. The output signals of the CFD 32 and threshold detector 30 are applied to an AND gate 34. The output of the AND gate 34 goes high, starting the counter 24, when the output signal of the CFD 32 generates a pulse and the input signal exceeds the threshold level established by the threshold detector 30. It will be appreciated that the CFD alone would not be suitable for starting the counter, because the CFD may produce an output pulse due to noise.

Figure 5:
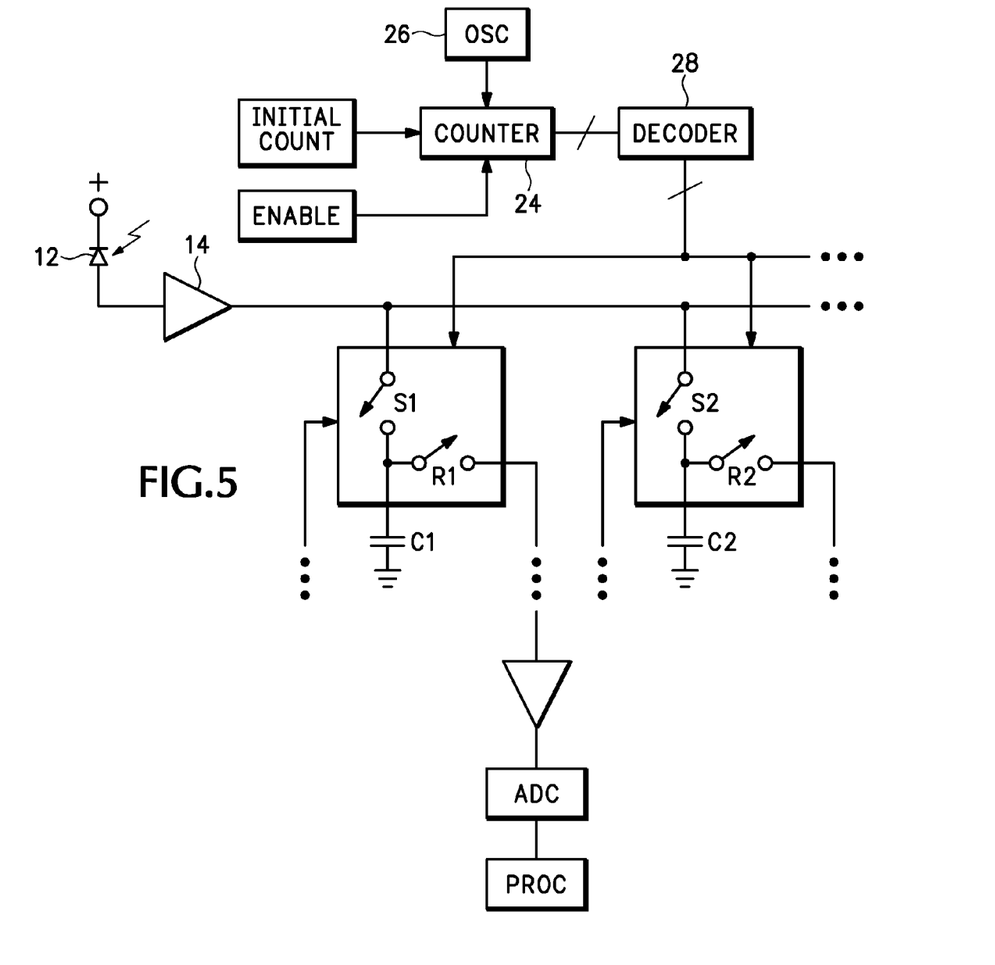
FIG. 5 is a schematic block diagram of part of a channel of a third streak camera embodying the present invention.

FIG. 5 illustrates a second approach. Again, let us assume that each row of the SCA contains 128 capacitors. However, the range of the counter 24 is not from 1-128 but is from 1-256 and the decoder 28 enables the switches S1-S128 in response to count values in the range 129-256. Prior to each acquisition, the counter 24 is initialized with an initial count value in the range from 1 to 128. For the first acquisition, the initial count value may be uniform across all the channels and may depend on the altitude of the probe. Assume that the initial count value is 100. An enable pulse is delivered to the counter 24 when the laser source 4 is pulsed and the counter commences counting from the initial count value. So long as the count is 128 or less, the decoder 28 does not enable the switches S1-S128. When the count reaches 129, i.e. after 29 clock pulses, the decoder starts successively closing and opening the switches S1-S128, as described above, whereby the output signal of the preamplifier 20 is sampled over the next 128 clock periods. Because the initial count value is below the count range to which the decoder responds, the output signal of the preamplifier is not sampled for an initial interval of 29 clock periods following pulsing of the laser source. The sample values are read out, column by column, as described with reference to FIG. 2, digitized, and analyzed by a processor. The processor determines, for each channel, the first sample attributed to glint from the water surface and calculates the initial count value to be used on a subsequent acquisition. For example, for the channel for which θ is zero, the processor might determine that the first sample attributed to glint from the water surface was captured by capacitor C33, which implies that the round-trip propagation time between the probe and water surface is 62 clock periods (29+33) and to provide a suitable margin for error, the processor may calculate the initial count value to be used on the next acquisition for that channel to be 58 (allowing a margin of 4 clock periods). For another channel, the processor might determine that the first sample attributed to glint was captured by capacitor C45 corresponding to a round-trip propagation time of 74 clock periods (29+45) of the oscillator and calculate an initial count value to be used on the next acquisition to be 70. In this manner, the sample times for each channel are adjusted to align the depth values associated with the capacitors across the several channels.

Figure 6:
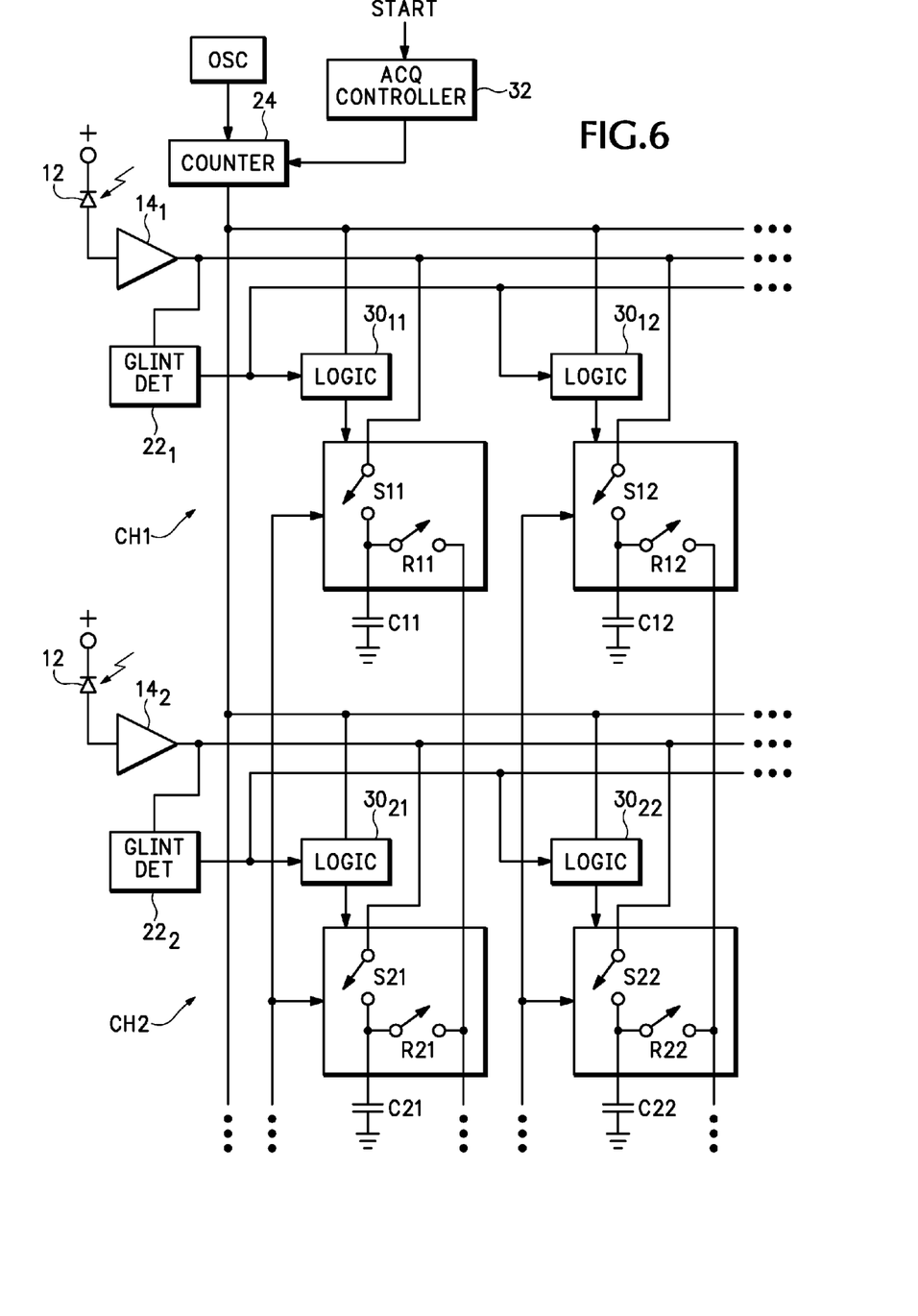
FIG. 6 is schematic block diagram of part of fourth streak camera embodying the present invention.

Referring to FIG. 6, in accordance with a third approach for controlling the sampling of the return light, one counter 24 for controlling the sampling switches Sij is shared by all the channels CH. A logic block 30ij is associated with each capacitor Cij and receives an input from the channel's glint detector 22i. An acquisition controller 32 resets the counter and starts the counter at a selected user-defined time (e.g. a fixed time after the laser pulse is emitted). When the count reaches a value y, the counter thereby selects the logic blocks 30iy and each logic block 30iy provides an output signal that closes and then opens the switch Siy. All the channels therefore start sampling simultaneously and store samples on respective capacitors, starting with capacitor C11. Assuming that each channel contains 128 capacitors, by counting from 1 to 128 the counter executes a first cycle of selecting the logic blocks 30i1-30i128 in succession. The counter does not stop counting when it completes its first cycle but resets to 1 and continues counting so that it executes a second cycle of selecting the logic blocks 30i1-30i128 in succession. Subject to the operation of the logic blocks, as described below, samples that were stored during the first cycle are overwritten by new sample values in the second cycle.

Assuming that the output of the glint detector 22i for channel CHi goes high when the count is equal to x (1<x<128), the logic blocks Lix-Li128 change state in a manner that records the fact that the glint detector output has gone high. As the counter continues counting, the count eventually reaches 128 and the counter starts selecting for a second time, starting with the block 30i1, the logic blocks that were selected in the first cycle. When the counter selects the logic block 30ix, the change in state referred to above prevents the logic block from enabling the switch Six and accordingly the sample value stored on the capacitor is not overwritten. Similarly, the change in state of the logic blocks Li(x+1)-Li128 prevents the sample values stored on the capacitors Ci(x+1)-Ci128 being overwritten. Accordingly, 128 sample values are stored for each channel, starting from the time at which the output signal of the glint detector for that channel went high. When the sample values stored in one column of the SCA are read out, the states of the logic blocks are also read out, allowing a signal processor to determine the count at which the glint detector output for each channel went high and align the sample values by reference to that count.

There are several possible ways in which the state of the logic block may change in order to record the fact that the output signal of the glint detector has gone high. For example, various combinations of sequential and/or combinational logic elements may be used to set a flag that can be used to inhibit subsequent overwriting of the sample values.

It will be appreciated that the output of the logic block could be fed forward or back by any number of columns of the SCA to change the column that prevents the overwrite.

In a modification of the approach described with reference to FIG. 6, each channel may include a counter that starts when the output signal of the glint detector goes high and disables the logic block, to prevent overwriting of previously stored samples, when the count reaches 128.

Figure 7:
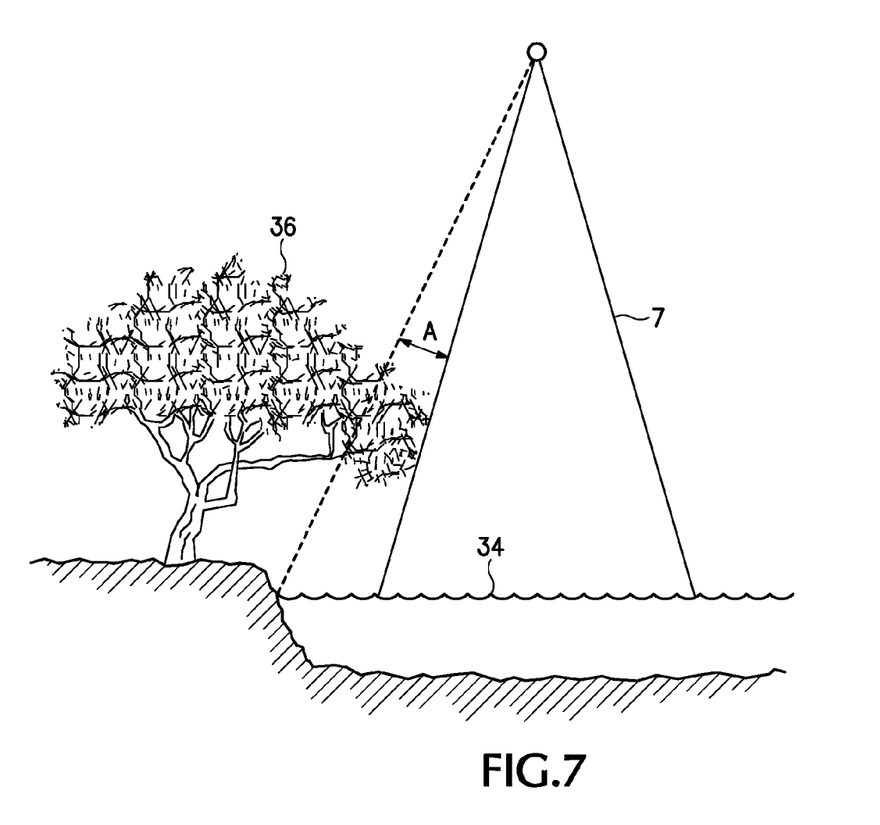
FIG. 7 illustrates schematically an application of a LIDAR system embodying the present invention.

In a further modification of the subject matter described in this application, referring to FIG. 7, a particularly challenging application of a LIDAR system is detection of submerged objects 8 in a body of water 34 where there is an obstruction 36 between the LIDAR system and the water, such as a leaf canopy along an edge of the body of water. In this case, the reflection from the leaf canopy would occur much sooner after transmission of the pulse than reflection from the water surface, particularly if the LIDAR system is at a relatively low altitude, and the return light signal would be attenuated as a function of density of the leaf canopy. By comparing the electrical signals provided by adjacent sensors, it is possible to distinguish between light signals returned from the water and signals returned from the leaf canopy (or other obstruction at the edge of the water) and thereby avoid making erroneous inferences based on the return signals from the leaf canopy. Accordingly, misinterpretation of return signals received in the sector A shown in FIG. 7 is avoided.

Figure 8:
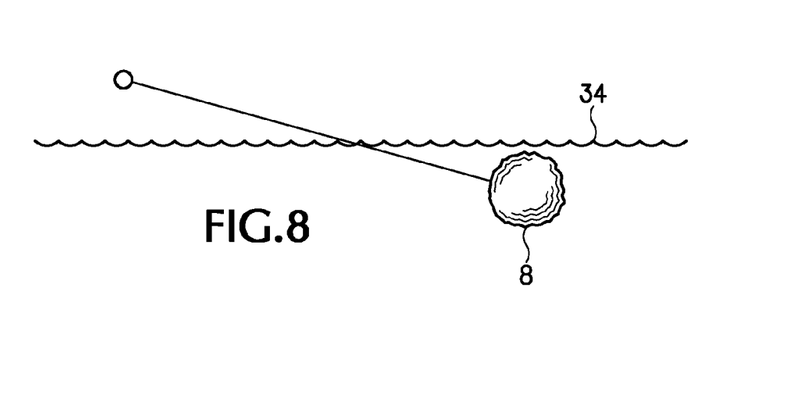
FIG. 8 illustrates schematically another application of a LIDAR system embodying the present invention.

FIG. 7 illustrates a case in which the fan beam 7 is directed vertically downward from the aircraft. However, in other applications of LIDAR, the LIDAR system addresses a swath that is forward of the platform carrying the LIDAR system, with respect to the path of movement of the platform, as shown in FIG. 8. This applies particularly in a riverine application, where the platform is a boat following the course of the river and the LIDAR system looks forward along the course of the river, sufficiently far ahead of the boat to allow the pilot of the boat to take evasive action should the LIDAR system detect a submerged object.

In the application as described above, the near boundary of the search volume that the LIDAR operator wishes to interrogate is the free surface of the body of water. In general, however, the near boundary of the search volume may be an interface between media of different optical properties. For example, the search volume might be between the top of a forest canopy and the ground, in which case the near boundary of the search volume would be the top of the forest canopy, although it will be appreciated that it might be difficult to detect the top of the forest canopy as precisely as the glint detector is able to detect the water surface, as described with reference to FIG. 3 or 4.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. For example, this application refers to a counter being used to generate the signals for sampling the return signal, the signals may instead be generated by an active delay line that produces a series of sampling pulses in response to an external trigger signal. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of operating a LIDAR system including a light source for emitting an optical fan beam towards a spatial region to be inspected, and a streak image sensor having a plurality of sensor elements for receiving optical return signals from the portions of the spatial region within their respective instantaneous fields of view, each sensor element generating corresponding electrical signals, the method comprising:

periodically sampling and storing the electrical signals generated by the sensor elements respectively, and initiating the periodic sampling of said electrical signals of each sensor element individually and independently by reference to a feature of that sensor element's electrical signal that represents a boundary between materials with different optical properties.

2. A method according to claim 1, wherein the boundary is between a gas and a liquid.

3. A method according to claim 1, wherein the boundary is between a liquid and a solid.

4. A method according to claim 1, wherein the boundary is between a gas and a solid.

5. A method according to claim 1, comprising initiating periodic sampling more than once.

6. A method according to claim 1, comprising recording sample values for each sensor's electrical signal.

7. A method according to claim 6, comprising recording only sample values that exceed a threshold value.

8. A method according to claim 6, comprising storing the sample values in a linear array of storage capacitors.

9. A method according to claim 1, wherein said feature represents a change in refractive index.

10. A method according to claim 1, wherein said feature is a change in the amplitude of the electrical signal from a value below a threshold level to a value exceeding said threshold level.

11. A method according to claim 10, wherein said feature is coincidence of an inflection of a rising edge of a transition of the electrical signal and the amplitude of the electrical signal exceeding a threshold level.

12. A method according to claim 1, wherein each sensor element comprises an avalanche photodiode.

13. A method according to claim 1, comprising storing a plurality of sample values of each electrical signal.

14. A method according to claim 1 comprising:

(a) initiating the periodic sampling of electrical signals from a first optical pulse at the same time for every sensor element, timed to coincide with the return of the first optical pulse from the nearest point on the boundary which marks the beginning of the search volume to be inspected, based upon the streak image sensor's distance to that point, (b) processing the electrical signals generated by the sensor elements responsive to the first pulse to measure the time delay between when sampling was initiated, and when each individual sensor element received the optical pulse return from the portion of the boundary within its instantaneous field of view, (c) initiating the periodic sampling of electrical signals from a subsequent optical pulse for each sensor element individually and independently, based upon the measured time delay for that sensor element, such that for a given number of samples of equal period, the same span of range behind the boundary is recorded for each sensor element, and (d) repeating steps (a), (b) and (c) as the streak image sensor moves relative to the search volume to be inspected, whereby the method corrects for differences in distance between each sensor element and the search volume to be inspected.

15. A method according to claim 1, wherein the step of periodically sampling the electrical signals comprises storing packets of electrical charge on respective capacitors and the method further comprises discharging the capacitors and measuring corresponding voltage quantities.

16. A method of operating a LIDAR system including a light source for emitting an optical fan beam through a first medium towards a second medium that is to be inspected, and a streak image sensor having a plurality of sensor elements for receiving optical return signals from the portions of the second medium within their respective instantaneous fields of view, each sensor element generating corresponding electrical signals, the method comprising:

periodically sampling and storing the electrical signals generated by the sensor elements respectively, and initiating the periodic sampling of said electrical signals of each sensor element individually by reference to expected distance of the sensor element from a boundary between the first medium and the second medium.

17. A method of operating a LIDAR system including a light source for emitting an optical fan beam towards a spatial region to be inspected, and a streak image sensor having a plurality of sensor elements for receiving optical return signals from the portions of the spatial region within their respective instantaneous fields of view, each sensor element generating corresponding electrical signals, the method comprising:

periodically sampling and storing the electrical signals generated by the sensor elements respectively, subsequently terminating the storing of samples of the electrical signal, and initiating the termination of storing of said samples of said electrical signals of each sensor element individually and independently by reference to a feature of that sensor element's electrical signal that represents a boundary between materials with different optical properties.

* * * * *